United States Patent
Barman et al.

(10) Patent No.: US 6,684,157 B2
(45) Date of Patent: Jan. 27, 2004

(54) METHOD AND SYSTEM FOR INTERFACING A GLOBAL POSITIONING SYSTEM, OTHER NAVIGATIONAL EQUIPMENT AND WIRELESS NETWORKS WITH A DIGITAL DATA NETWORK

(75) Inventors: Alan W. Barman, Farmington Hills, MI (US); Michael R. Boyd, Saline, MI (US); David J. Paul, Canton, MI (US)

(73) Assignee: Yazaki North America, Inc., Canton, MI (US)

( * ) Notice: Subject to any disclaimer, the term of this patent is extended or adjusted under 35 U.S.C. 154(b) by 0 days.

(21) Appl. No.: 10/011,171

(22) Filed: Dec. 6, 2001

(65) Prior Publication Data

US 2003/0109987 A1 Jun. 12, 2003

(51) Int. Cl.$^7$ ................................................. G01C 1/00
(52) U.S. Cl. ...................... 701/213; 701/200; 73/178 R; 340/989
(58) Field of Search ................................. 701/213, 200, 701/211, 220; 73/178 R; 340/989, 990, 991, 993, 995

(56) References Cited

U.S. PATENT DOCUMENTS

| | | | | |
|---|---|---|---|---|
| 4,850,042 A | | 7/1989 | Petronio et al. | |
| 5,481,588 A | * | 1/1996 | Rickli et al. ................... 379/24 |
| 5,504,482 A | * | 4/1996 | Schreder ...................... 340/988 |
| 5,617,317 A | * | 4/1997 | Ignagni ................. 342/357.08 |
| 5,712,899 A | * | 1/1998 | Pace, II ...................... 455/456 |
| 5,812,789 A | | 9/1998 | Diaz et al. | |
| 5,903,548 A | | 5/1999 | Delamater | |
| 5,917,624 A | | 6/1999 | Wagner | |
| 5,928,309 A | * | 7/1999 | Korver et al. ............... 342/359 |
| 5,948,044 A | * | 9/1999 | Varley et al. ................ 701/213 |
| 5,982,854 A | | 11/1999 | Ehreth | |
| 6,009,307 A | | 12/1999 | Granata et al. | |
| 6,018,704 A | * | 1/2000 | Kohli et al. ................. 342/457 |
| 6,032,084 A | * | 2/2000 | Anderson et al. ............ 700/241 |
| 6,075,467 A | * | 6/2000 | Ninagawa .................... 340/990 |
| 6,085,148 A | * | 7/2000 | Jamison et al. ......... 342/357.01 |
| 6,111,539 A | * | 8/2000 | Mannings et al. ...... 342/357.09 |
| 6,137,425 A | * | 10/2000 | Oster et al. .................. 340/992 |
| 6,202,023 B1 | * | 3/2001 | Hancock et al. ............. 701/201 |
| 6,204,808 B1 | * | 3/2001 | Bloebaum et al. ...... 342/357.07 |
| 6,212,475 B1 | * | 4/2001 | France et al. ........... 342/357.12 |
| 6,219,385 B1 | * | 4/2001 | Weinberg .................... 342/463 |
| 6,236,937 B1 | * | 5/2001 | Kohli .......................... 342/355 |
| 6,240,365 B1 | * | 5/2001 | Bunn .......................... 340/988 |
| 6,246,361 B1 | * | 6/2001 | Weill et al. ............. 342/357.01 |
| 6,246,672 B1 | * | 6/2001 | Lumelsky .................... 370/310 |
| 6,252,544 B1 | * | 6/2001 | Hoffberg ................ 342/357.06 |
| 6,278,939 B1 | * | 8/2001 | Robare et al. .......... 342/357.01 |
| 6,282,496 B1 | * | 8/2001 | Chowdhary ............ 342/357.08 |
| 6,292,749 B2 | * | 9/2001 | Kohli .......................... 342/355 |
| 6,295,023 B1 | * | 9/2001 | Bloebaum ............... 342/357.06 |
| 6,298,306 B1 | * | 10/2001 | Suarez et al. ........... 342/357.07 |
| 6,311,128 B1 | * | 10/2001 | Prum et al. .................. 324/331 |
| 6,317,688 B1 | * | 11/2001 | Bruckner et al. ............. 244/3.1 |
| 6,370,449 B1 | * | 4/2002 | Razavi et al. ................ 340/438 |
| 6,374,176 B1 | * | 4/2002 | Schmier et al. ............. 340/988 |
| 6,377,890 B1 | * | 4/2002 | Doi ............................. 340/988 |
| 6,515,620 B1 | * | 2/2003 | Jandrell ................. 342/357.12 |

* cited by examiner

Primary Examiner—William A. Cuchlinski, Jr.
Assistant Examiner—Olga Hernandez
(74) Attorney, Agent, or Firm—Rader, Fishman & Grauer PLLC (57) ABSTRACT

An improved system and method of integrating GPS and wireless communication systems with the systems of a user's vehicle make the GPS and wireless communication systems more readily and safely accessible to the vehicle operator during travel. GPS and data from other navigational equipment is transmitted over a digital data network, preferably a fiber optic network, that is provided in a vehicle for distributing data among the various electronic devices on-board. Voice and data streams sent to, and received from, wireless networks operating in the area, e.g., a WWAN, WPAN or WLAN, are also distributed over the fiber optic network for use by various on-board devices. An antenna farm, for a GPS receiver and wireless transceivers, can be connected to the on-board data network.

10 Claims, 6 Drawing Sheets

METHOD AND SYSTEM FOR INTERFACING A GLOBAL POSITIONING SYSTEM, OTHER NAVIGATIONAL EQUIPMENT AND WIRELESS NETWORKS WITH A DIGITAL DATA NETWORK

FIELD OF THE INVENTION

The present invention relates to the field of navigation in a motorized vehicle. The present invention also relates to the field of wireless communication of voice and data streams. The present invention also relates to the field of distributing data over a digital data network. More particularly, the present invention relates to a means and method of interfacing navigational equipment, such as a Global Positioning System (GPS), and wireless voice and data networks with a wired, digital data network installed in a vehicle so that data from the navigational equipment and wireless networks can be distributed and used by devices on the in-vehicle network.

BACKGROUND OF THE INVENTION

Global Positioning Systems (GPS) are self-contained, portable devices that use transmissions from a number of orbiting satellites to determine their own location. A GPS unit can define its location in terms of latitude and longitude anywhere in the world.

For obvious reasons, GPS units are commonly used in motorized vehicles: cars, trucks, buses, boats, ships, aircraft, etc. With the information from an on-board GPS unit, and a review of how that information changes over time, a vehicle's direction or heading, velocity and other parameters can be determined. Additionally, other navigational equipment can be used to supplement the data generated by a GPS unit.

GPS units are also often integrated with an electronic mapping system. The mapping system may include a display device on which a map of the user's locality is displayed. With the GPS data, the position of the user or the user's vehicle can be illustrated on the displayed map to assist a user in finding his or her way to a destination that is also mapped. The mapping system may also be able to generate directions or prompts based on a designated destination and the user's current location as identified by the GPS data.

While GPS units and related equipment help a user navigate while in unfamiliar territory, the user can also stay in communication while roaming using a wireless telephone. Wireless telephones operate by transmitting radio frequency (RF) signals between the user's handset unit and a network of base stations distributed throughout a service area. These wireless networks, sometimes referred to as Wireless Wide-Area Networks (WWANs), can be used to transmit data as well as voice to and from the user's location.

In addition to conventional WWAN infrastructure for supporting wireless telephones and other wireless data devices, some localities are developing wireless data networks on a more limited scale. These networks, Wireless Local-Area Networks (WLANs), may exist, for example, in a particular building, among a complex of buildings, in a particular neighborhood or business district, etc. WLANs can also be used for carrying data, including voice data, to and from a user's registered wireless device. Additionally, a Wireless Personal Area Network (WPAN) will allow wireless devices to communicate inside the vehicle. These networks can connect cellphones, headphones, personal digital assistants and other information devices over a limited range.

Thus, GPS and other navigational equipment help a user to constantly identify his or her position and navigate to a desired destination. At the same time, wireless networks and the devices that communicate with those networks, allow the user to remain in voice and data communication while traveling. Consequently, a natural environment for the use of both GPS and wireless communications is in a user's vehicle.

This being the case, there is a need in the art for an improved means and method of integrating GPS and wireless communication systems with the systems of a user's vehicle so as to make the GPS and wireless communication systems more readily and safely accessible to the vehicle operator during travel.

SUMMARY OF THE INVENTION

The present invention meets the above-described needs and others. Specifically, the present invention provides an improved means and method of integrating GPS and wireless communication systems with the systems of a user's vehicle so as to make the GPS and wireless communication systems more readily and safely accessible to the vehicle operator during travel.

Additional advantages and novel features of the invention will be set forth in the description which follows or may be learned by those skilled in the art through reading these materials or practicing the invention. The advantages of the invention may be achieved through the means recited in the attached claims.

The present invention may be embodied and described as a navigational system for a vehicle having: a GPS receiver; a digital data network installed in the vehicle; and a network interface connecting the GPS receiver and the digital data network. The GPS receiver outputs navigational data on the digital data network.

In another embodiment, the present invention may provide a wireless communication system for a vehicle having: a wireless network stage with an antenna for communicating with a wireless network that has a service area in which the vehicle is located; a digital data network installed in the vehicle; and a digital network interface connecting the wireless network stage to the digital data network so that data received via the wireless network stage can be transmitted over the digital data network and data from the digital data network can be transmitted to the wireless network via the wireless network stage.

The present invention also encompasses an embodiment that combines these two systems. Thus, the present invention may be embodied as a navigational and communications system for a vehicle having: a GPS receiver; a wireless network stage with an antenna for communicating with a wireless network that has a service area in which the vehicle is located; a digital data network installed in the vehicle; and a digital network interface connecting the wireless network stage and the GPS receiver to the digital data network. Data received via the wireless network stage can be transmitted over the digital data network and data from the digital data network can be transmitted to the wireless network via the wireless network stage. The GPS receiver also outputs navigational data on the digital data network.

The present invention also encompasses the methods of making and operating the systems that embody the present invention. For example, the present invention encompasses a method of providing navigational data in a vehicle by connecting a GPS receiver through a network interface to a digital data network installed in the vehicle such that the GPS receiver will output navigational data on the digital data network.

The present invention also encompasses a method of providing wireless communications in a vehicle by providing a wireless network stage for communicating with a wireless network that has a service area in which the vehicle is located; and providing a connection between the wireless network stage and a digital data network installed in the vehicle. In addition, the present invention encompasses a method of providing wireless communications between devices inside the vehicle, and providing a connection between the wireless network stage and a digital network installed in the vehicle.

The present invention also encompasses a method of providing navigational and communication systems for a vehicle by connecting a GPS receiver through a network interface to a digital data network installed in the vehicle such that the GPS receiver will output navigational data on the digital data network; providing a wireless network stage for communicating with a wireless network that has a service area in which the vehicle is located; and providing a connection between the wireless network stage and the digital data network installed in the vehicle.

BRIEF DESCRIPTION OF THE DRAWINGS

The accompanying drawings illustrate preferred embodiments of the present invention and are a part of the specification. Together with the following description, the drawings demonstrate and explain the principles of the present invention.

FIG. 2a is a flowchart outlining the operation for processing navigational data from the GPS receiver and inertial sensor of FIG. 2. FIG. 2a may also be considered as a software diagram for some of the programming run by the micro-controller of FIG. 2.

FIG. 2b is a flowchart outlining the operation for updating the correction factor applied to the data from the inertial sensor of FIG. 2 based on the location of the vehicle. FIG. 2b may also be considered as a software diagram for some of the programming run by the micro-controller of FIG. 2.

Throughout the drawings, identical elements are designated by identical reference numbers.

DETAILED DESCRIPTION OF THE PREFERRED EMBODIMENTS

The present invention provides an improved means and method of integrating GPS and wireless communication systems with the systems of a user's vehicle so as to make the GPS and wireless communication systems more readily and safely accessible to the vehicle operator during travel. GPS and data from other navigational equipment is transmitted over a digital data network, preferably a fiber optic network, that is provided in a vehicle for distributing data among the various electronic devices on-board. Voice and data streams sent to, and received from, wireless networks operating in the area, e.g., a WWAN, WLAN or WPAN, are also distributed over the fiber optic network for use by various on-board devices.

Using the drawings, the preferred embodiments of the present invention will now be explained.

Figure 1:
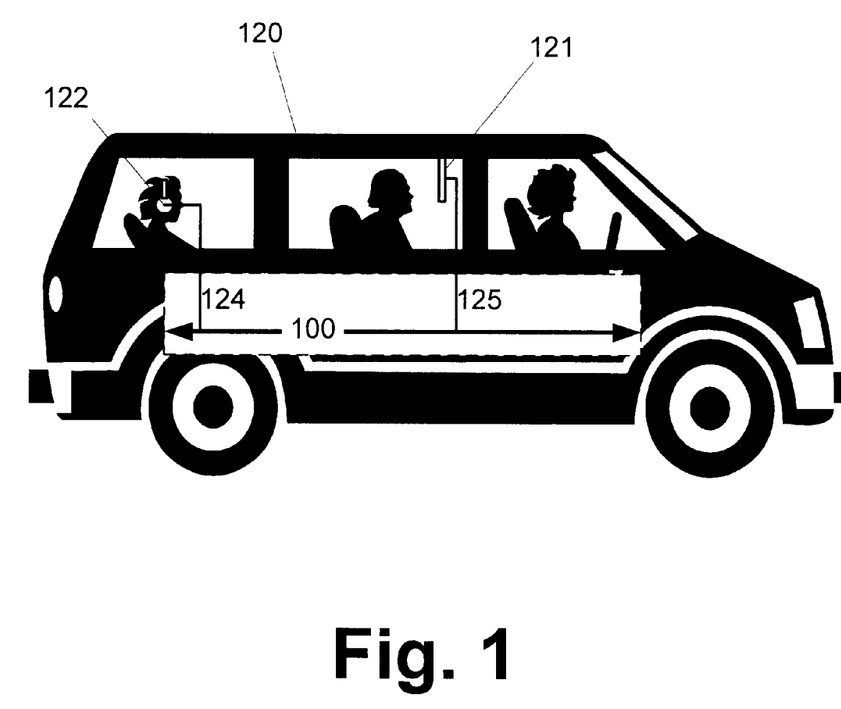
FIG. 1 is an illustration of an exemplary vehicle with a digital data network installed on-board as contemplated by the principles of the present invention.

Vehicles represent a particular environment in which navigational data, wireless communications and audiovisual programming, for entertainment or information, are frequently desired. To meet the need for audiovisual programming, in particular, as shown in FIG. 1, the present invention contemplates a vehicle (120) that includes an on-board digital data network (100). As will be understood, the term "vehicle" as used herein, and in the appended claims, encompasses all forms of motorized transportation, including, but not limited to, cars, vans, trucks, buses, sport-utility vehicles, airplanes, aircraft, boats, ships and the like.

Preferably, the on-board digital data network (100) is a fiber optic network. Generally, fiber optic networks are robust and capable of carrying large amounts of digital data. As used herein and in the appended claims, the term "network" refers to a data-bearing link between electronic devices that are connected to the data-bearing link at least two different points.

With the provision of the data network (100) in the vehicle, data, e.g., audiovisual programming data, can be communicated by the network (100) to various parts of the vehicle (120) for use by vehicle passengers. For example, one passenger may be watching a television, video monitor or display device (121) that is connected (125) to the data network (100) and receives an appropriate video or audiovisual signal there from.

Additionally, another passenger may be listening to an audio program through a set of headphones (122) that are connected (124) to the network (100) and receive an audio signal there from.

The network (100) can carry digital data in any format. Consequently, the network (100) may be carrying, for example, a DVD audiovisual data stream; and/or an MPEG-1, MPEG-2 or MPEG-4 audiovisual data stream; and/or a Motion JPEG or Video CD (VCD) audiovisual data stream, and/or a CD audio data stream, and/or an MP3 audio data stream, etc. By packetizing data, the network can also carry multiple data streams simultaneously. Obviously, the network will have to carry data in a format useable by the various output devices, or those output devices will have to be connected to the network with an interface that translates the incoming audiovisual data stream into a form useable by that output device.

As used herein and in the appended claims, the term "audiovisual output device" or "output device" refers to any device that renders an audiovisual signal or data stream perceptible, visually or aurally, to a human user. Consequently, output devices include, but are not limited to, speakers, headphones, earpieces, display devices, LCDs, video monitors, televisions, cathode ray tubes, etc.

Figure 2:
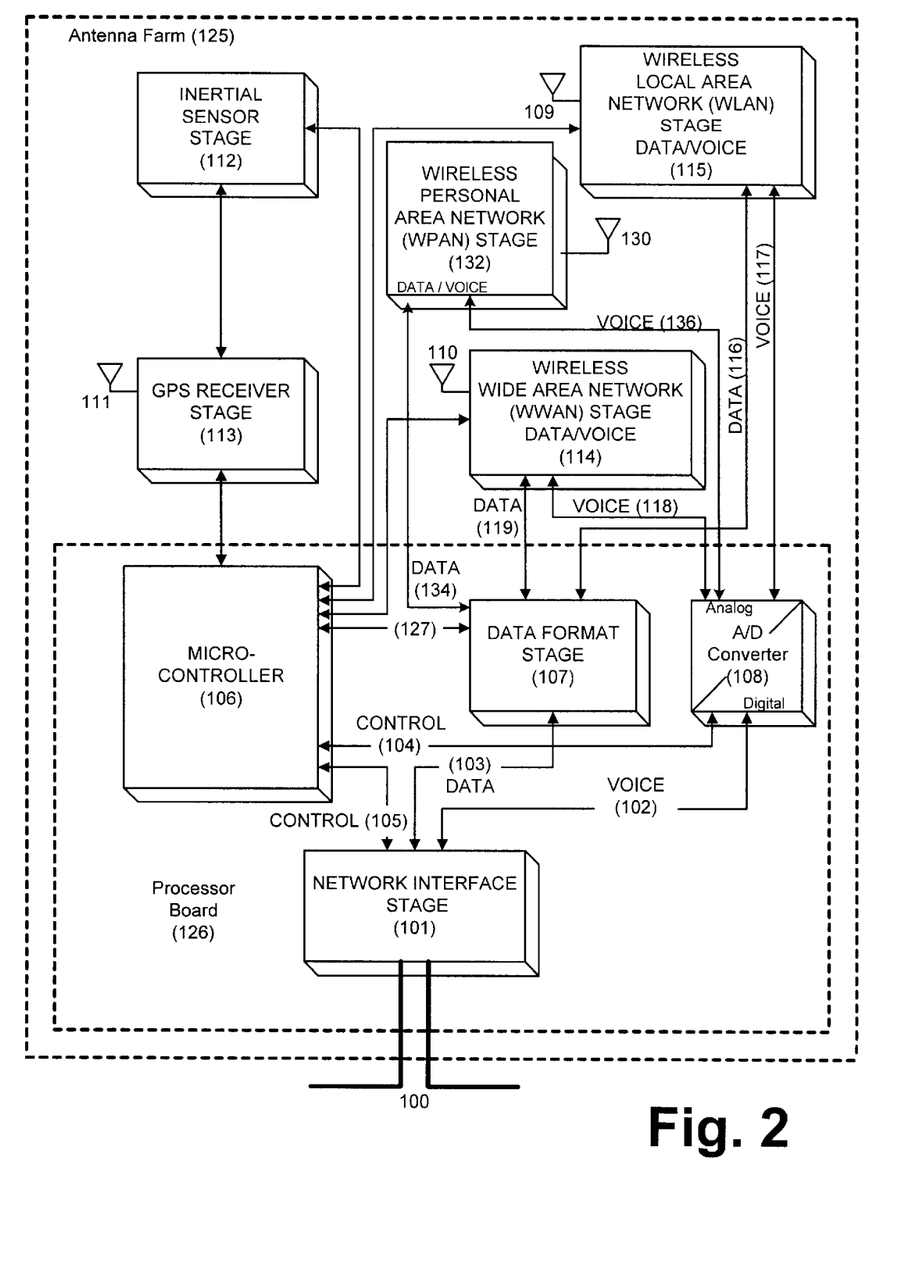
FIG. 2 is a block diagram of an antenna farm for a GPS receiver and wireless network transceivers that may be connected to an in-vehicle data network according to the principles of the present invention.

In addition to supporting the distribution and playback of audio and audiovisual programming through audiovisual output devices in the vehicle, the data network (100) can also be used, under the principles of the present invention, to make GPS, other navigational data, and wireless communications available to a number of users throughout the vehicle (120). FIG. 2 is a block diagram of an antenna farm for a GPS receiver and wireless network transceivers that are interfaced with the in-vehicle data network (100) according to the principles of the present invention.

As shown in FIG. 2, the present invention preferably includes an antenna farm (125). The antenna farm (125) preferably includes a GPS receiver (113) with an antenna (111). As noted above, this GPS receiver (113) receives transmissions from a number of orbiting satellites via the antenna (111). With the data from these transmissions, the receiver (113) can determine its physical location in the world, usually in terms of longitude and latitude, and, perhaps, altitude.

More specifically, the GPS receiver (113) may receive data from 24 satellites circling the Earth. This data is converted to National Marine Electronics Association (NMEA) standard data packets. These data packets are transmitted to an appropriately programmed micro-controller (106) that reads the data and can determine from the data the vehicles' latitude, longitude, heading, speed, etc.

If the vehicle's speed is low, however, the correspondingly slow change in GPS data can make it difficult to accurately determine the vehicle's heading. Consequently, other navigational equipment may be used to supplement the GPS receiver (113). In the exemplary embodiment of FIG. 2, this supplementary navigational equipment may be an inertial sensor stage (112). The inertial sensor stage (112) may include an altimeter, odometer reading, speedometer reading, gyro, accelerometer, wheel speed/direction sensors, digital compass, etc. In particular, the digital compass of the inertial sensor obtains vehicle-heading information from a circuit that detects the Earth's magnetic field. This heading data is also provided to the GPS receiver or the micro-controller (106) and is used to check or replace the heading data provided by the GPS receiver (113) if the vehicle is moving too slowly for the data from the GPS receiver (113) to provide an accurate vehicle heading indication.

Figure 2A:
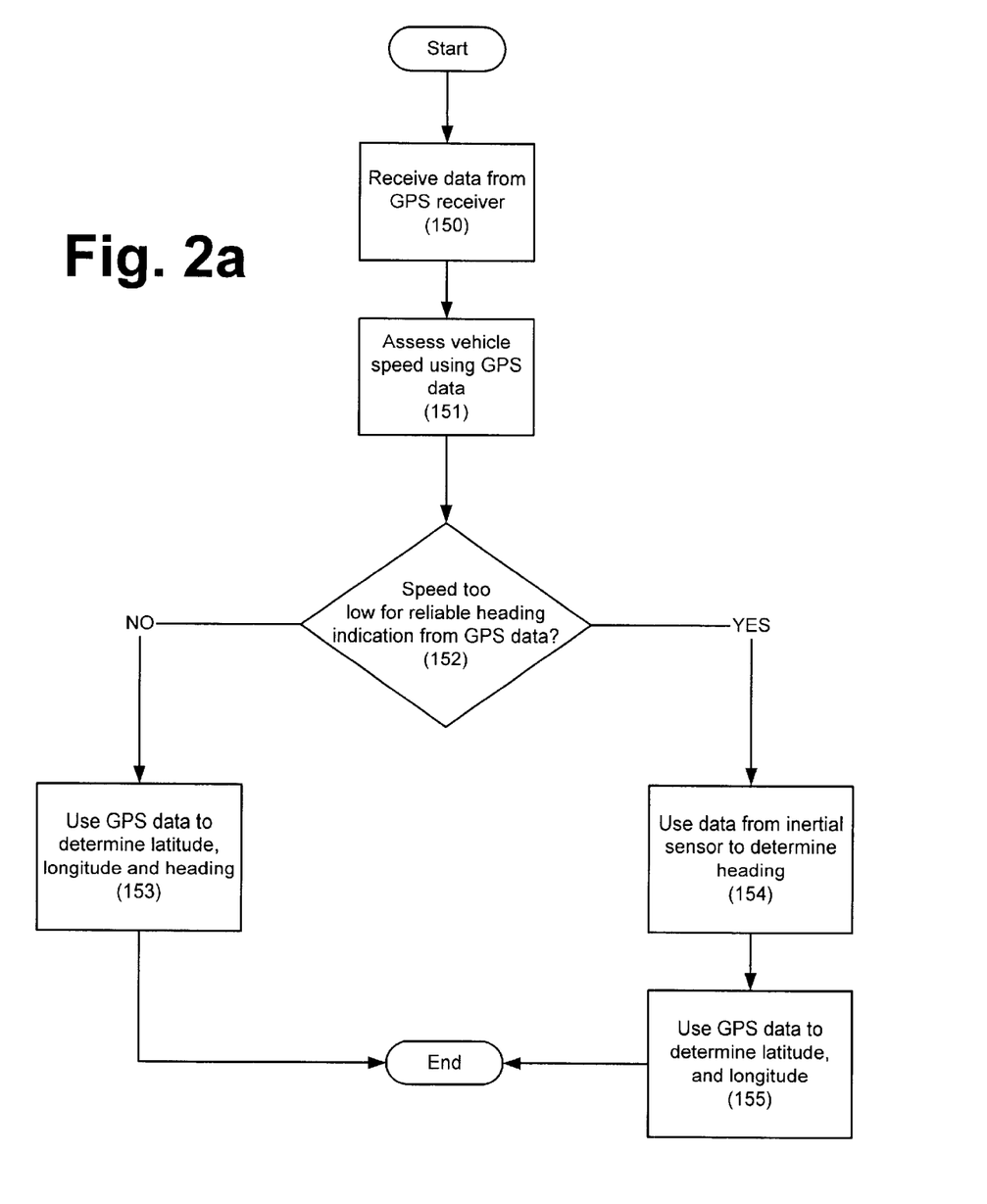

FIG. 2a illustrates the use of the combined resources of the GPS receiver (113) and the inertial sensor stage (112). FIG. 2a may also be considered as a diagram for software or programming run by the micro-controller (106) when utilizing data from the GPS receiver (113) and the inertial sensor stage (112).

As shown in FIG. 2a, the micro-controller receives data from the GPS receiver (150). With this data, the micro-controller assesses the speed of the vehicle (151). The micro-controller may also receive data from the vehicle speedometer to determine vehicle speed. Below a predetermined speed, the GPS data will be considered as providing an unreliable indication of the vehicle's heading (152).

If the vehicle's speed is above the threshold speed, the GPS data will be used to determine the vehicle's latitude, longitude, heading, etc. (153). Alternatively, if the speed is low enough to render GPS heading data unreliable, data from the inertial sensor will be used to determine heading (154). The GPS data will be used to determine the vehicle's latitude and longitude (155).

In addition to this arrangement in which data from the inertial sensor is used to correct or supplement the data from the GPS receiver, data from the GPS receiver can also be used to improve the performance of the inertial sensor. The GPS receiver can improve the accuracy of the inertial sensor by indicating geographically where the inertial sensor is.

Throughout the world, there are local variations in the Earth's magnetic field. Additionally, the effective angular difference between the geographic North Pole and the magnetic north pole will vary depending on the vehicle's location. Thus, a correction factor must be used when interpreting the output of the inertial sensor to get an accurate indication of the vehicle's heading. Typically, the inertial sensor in a vehicle is initially calibrated based on where the vehicle is sold. This is done by manually entering a declination zone number for the declination zone in which the vehicle is sold. A correction factor for the inertial sensor is automatically associated with the indicated declination zone.

If the vehicle is driven into another declination zone, the inertial sensor will no longer be properly calibrated and will, therefore, be inaccurate. This inaccuracy can amount to as much as 30 degrees if, for example, the vehicle is driven across the continental United States. Because this need to calibrate the inertial sensor is not well known and is usually performed by sales staff before a vehicle is purchased, the vehicle may be moved into another declination zone, perhaps permanently, without the inertial sensor being properly re-calibrated.

This problem is addressed in the present invention using the GPS receiver (113). As noted above, the GPS receiver (113) can always determine its latitude and longitude. This will also indicate in which declination zone the GPS receiver (113), and the inertial sensor (112), are located. Consequently, re-calibration of the inertial sensor (112) as to declination zone can be done automatically using the data from the GPS receiver (113). In this way, the inertial sensor (112) will remain calibrated for maximum accuracy even if the vehicle is taken from one declination zone to another.

Figure 2B:
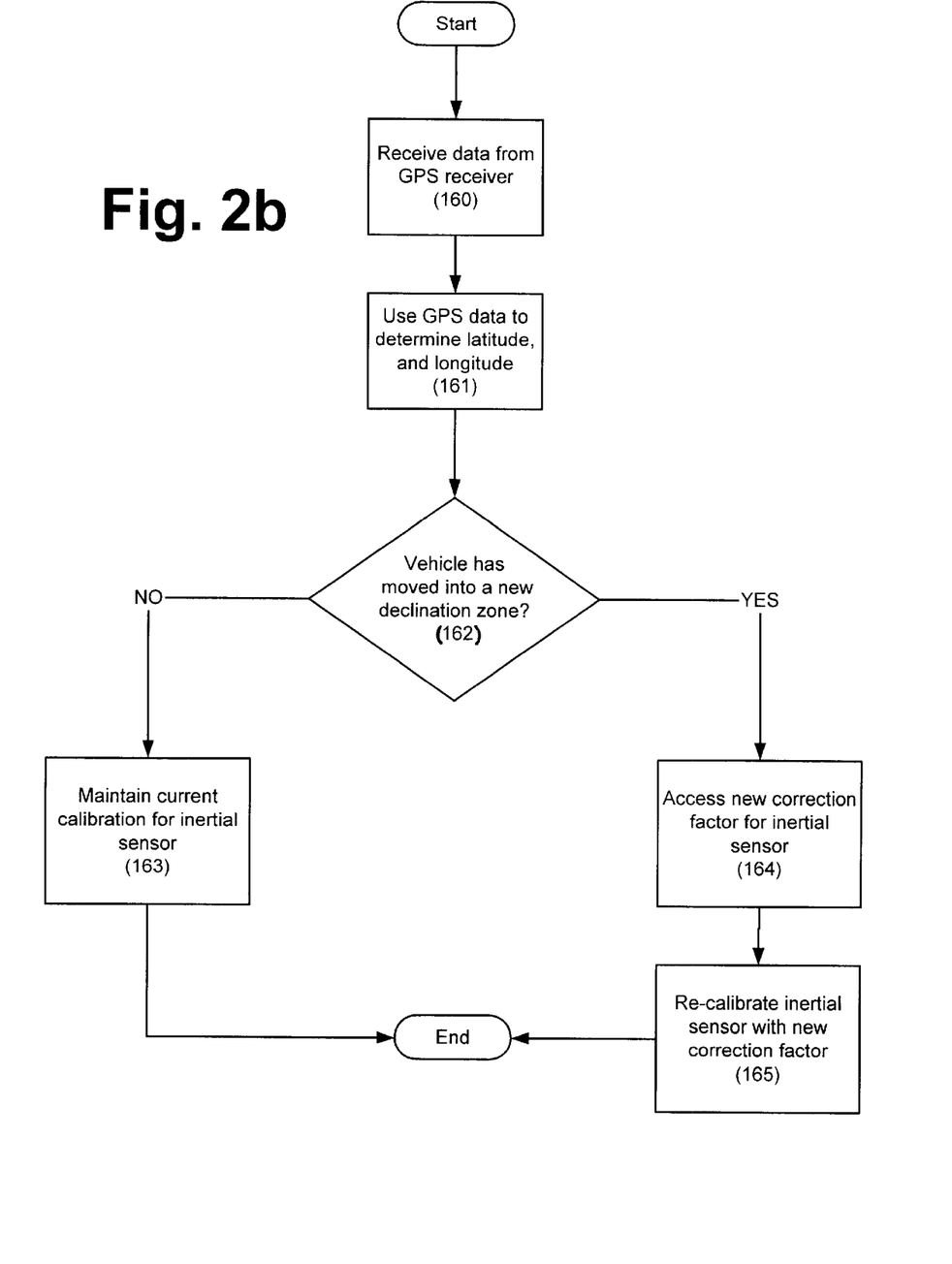

FIG. 2b illustrates this use of the GPS data to calibrate the inertial sensor stage (112). FIG. 2b may also be considered as a diagram for software or programming run by the micro-controller (106) when utilizing data from the GPS receiver (113) and the inertial sensor stage (112).

As shown in FIG. 2b, the micro-controller receives data from the GPS receiver (160). The GPS data specifies or is used to determine the latitude and longitude of the vehicle (161). It can then be determined if the vehicle has moved from the original declination zone into another (162). If no such movement has occurred, the current calibration or correction factor for the inertial sensor is maintained (163).

However, if the latitude and longitude readings indicate that the vehicle has moved to another declination zone, a new correction factor for the inertial sensor is identified (164). This may be done through a look-up table available to the micro-controller or other means. This new correction factor is then applied to the data output by the inertial sensor (165) to obtain an accurate vehicle heading.

Returning to FIG. 2, after the micro-controller (106) receives the navigational information from the inertial sensor stage (112) and the GPS receiver stage (113), the micro-controller (106) can make that information available to other devices over the digital network (100). The navigational data (127) can be transmitted from the micro-controller (106) to the data format stage (107) where the data is formatted for transmission over the network (100) and for use by other networked devices.

The micro-controller (106) then sends a control signal (105) to the network interface stage (101). The network interface stage (101) also receives the formatted navigational data (103) from the data format stage (107). The network interface stage (101) then transmits that formatted navigational data over the in-vehicle data network (100).

Preferably, the network (100) is a fiber optic network. In which case, the network interface stage (101) includes an optical transceiver. The interface (101) then transmits and receives optical data signals, including sending the navigational data over the network (100) for use by other networked devices. The use of the navigational data by other networked devices will be explained below in more detail in connection with FIG. 4.

As shown in FIG. 2, the micro-controller (106), the data format stage (107) and the network interface stage (101) are preferably all provided on a common processor board (126). This board (126) is considered part of, and supports, the antenna farm (125).

In addition to providing the navigational data from the inertial sensor (112) and the GPS receiver stage (113), the antenna farm (125) also preferably includes the ability to communicate with a wireless personal area network (WPAN), a wireless local area network (WLAN), and a wireless wide area network (WWAN). To this end, the antenna farm (125) preferably includes an antenna (130) connected to a WPAN stage (132), an antenna (109) connected to a WLAN stage (115) and another antenna (110) connected to a WWAN stage (114). To reduce cost, the multiple device stages may be able to use some common components if possible.

As noted above, WWANs include the well-known infrastructures by which wireless phones transmit voice and data. Examples of WWANs include, but are not limited to, GSM, GPRS, SMS, TDMA, CDMA, WCDMA, CDMA2000, CDPD, AMPS, EDGE, SMS, PCS and other networks. A WWAN can be analog, digital, narrow band, wide band, voice, packet data, message data, etc.

WLANs usually cover a smaller service area than a WWAN, but can also carry both data and voice communications. Examples of WLANs include, but are not limited to, IEEE 802.11, HomeRF, HiperLAN and other networks. WPANs usually cover a smaller service area than a WLAN, but can also carry voice and data communications. Examples of WPANs include, but are not limited to, 802.15, Bluetooth, and other networks.

Consequently, the WLAN stage (115) may output both a data stream (116) and a voice stream (117). Similarly, the WWAN stage (114) may also output a data stream (119) and a voice stream (118). Also, the WPAN stage (132) may output a data stream (134) and a voice stream (136).

The voice streams (117, 118) from the WWAN stage (114), WPAN stage (132) and the WLAN stage (115) are typically received as analog signals are therefore sent to an analog-to-digital converter (108). This converter (108) may also be referred to as an audio CODEC stage. Under control (104) of the micro-controller (106), the converter or CODEC (108) renders these signals (118, 117) as a digital voice stream (102). The digital voice data stream (102) is sent to the network interface stage (101) for transmission on the in-vehicle network (100).

This link is also two-way. For example, digital voice data may be transmitted over the network (100) from a microphone interfaced with the network (100). This incoming voice data stream is sent (102) to the converter (108) where it is converted into an analog audio signal (118, 117). The analog audio signal (118, 117) can then be sent to either the WWAN stage (114), WLAN stage (115), or the WPAN stage (132) for transmission to the respective WWAN, WLAN or WPAN operating the service area where the vehicle is located.

In addition to voice communications, the WWAN, WLAN and WPAN can also be used for data communications. When a data signal (119, 116) is received by the WWAN stage (114), WLAN stage (115), or WPAN stage (132), that data signal (119, 116, 134) is sent to the data format stage (107) where it is formatted for transmission over the network (100). The formatted data (103) is output by the data format stage (107) to the network interface stage (101) for transmission over the network (100).

Again, this is a two-way link. Digital data may be transmitted to the antenna farm (125) over the network (100). The data is received by the network interface stage (101) and then provided to the data format stage (107). From the data format stage (107) the data can be sent (119, 116) to the WWAN stage (114), the WLAN stage (115), or the WPAN stage (132) for wireless transmission to either or both of those networks.

Figure 3:
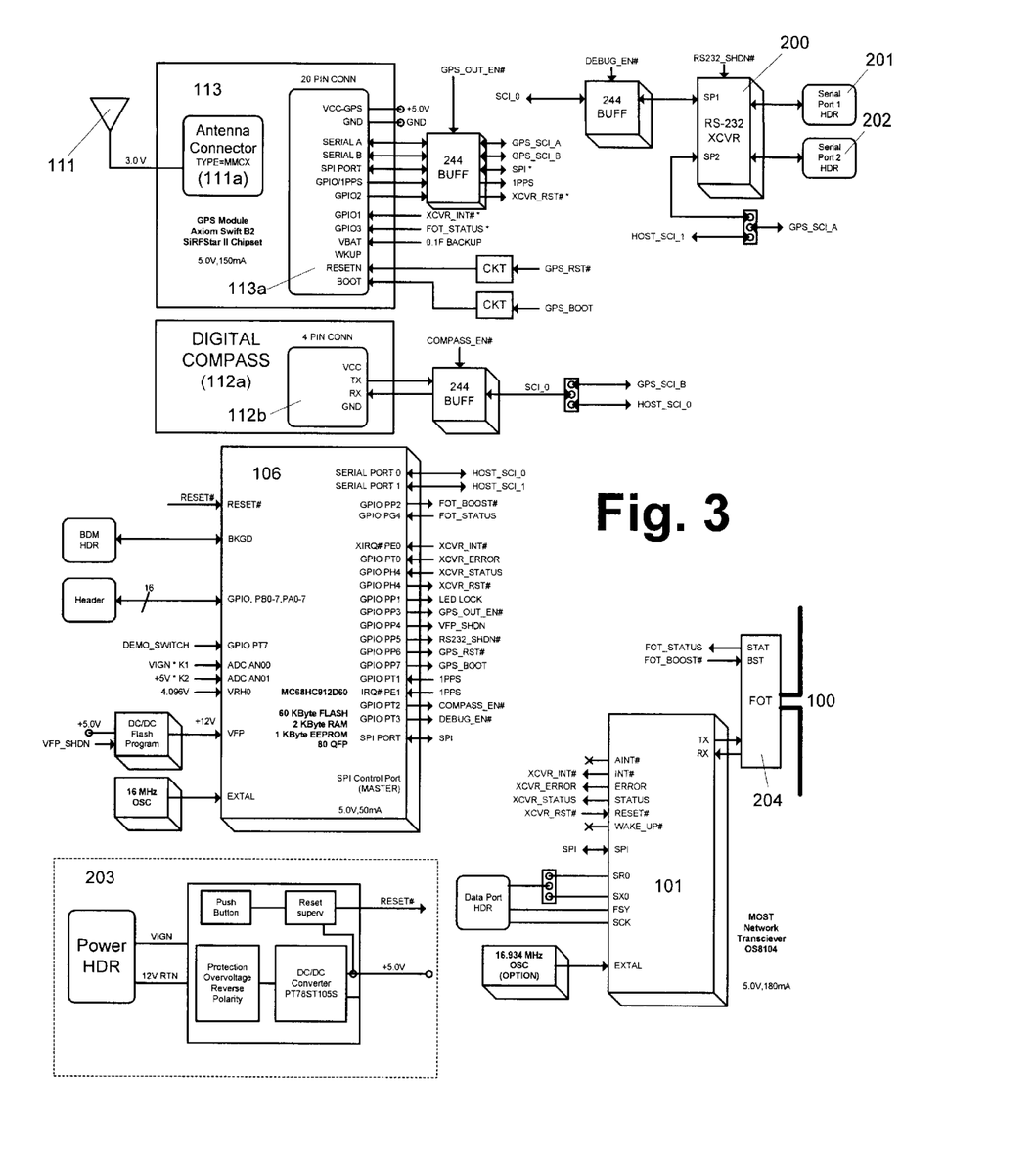
FIG. 3 is a more detailed diagram of the GPS receiver and supporting systems illustrated in FIG. 2.

FIG. 3 is a more detailed diagram of the GPS receiver and supporting systems illustrated in FIG. 2. As shown in FIG. 3, the antenna (111) is connected through an antenna connector (111a) to the GPS receiver stage (113). Through the antenna (111), the GPS receiver stage (113) receives the satellite transmissions that enable the GPS receiver stage (113) to generate navigational data. The GPS receiver stage (113) is connected to the antenna farm system through a connector (113a), preferably a 20-pin connector as shown in FIG. 3. Preferably, the GPS Module powers up in NMEA protocol, 4800,N,8,1.

The inertial sensor of the antenna farm may, in the specific example of FIG. 3, be a digital compass (112a). A connector (112b), preferably a 4-pin connector (112b) as shown in FIG. 3 connects the digital compass (112a) to the antenna farm system.

As before, the antenna farm system is controlled by the micro-controller (106). The antenna farm system is interfaced with the in-vehicle data network (100) through the network interface stage (101). In the preferred embodiment in which the network (100) is a fiber optic network, the network interface stage will include a fiber optic transceiver (204). Hardware jumpers on the board in the form of zero ohm resistors may be used to make the connection from the GPS system to the fiber optic transceiver (204).

A power circuit (203) is also provided to power the various components of the GPS receiver stage and supporting electronics as shown in FIG. 3. The power supply is preferably 5.0V+/−2% (4.9V to 5.1V). Battery backup (VBAT) of 1.8V to 3.8V 10uA may also be provided.

It may also be desirable to interface other devices, such as an electronic mapping system, directly with the GPS receiver stage of FIG. 3 without connecting to the network (100). For this purpose, a transceiver (200) supporting two serial ports (201, 202) may be integrated into the GPS system illustrated in FIG. 3. Standard headers may be used for all power and serial ports.

Figure 4:
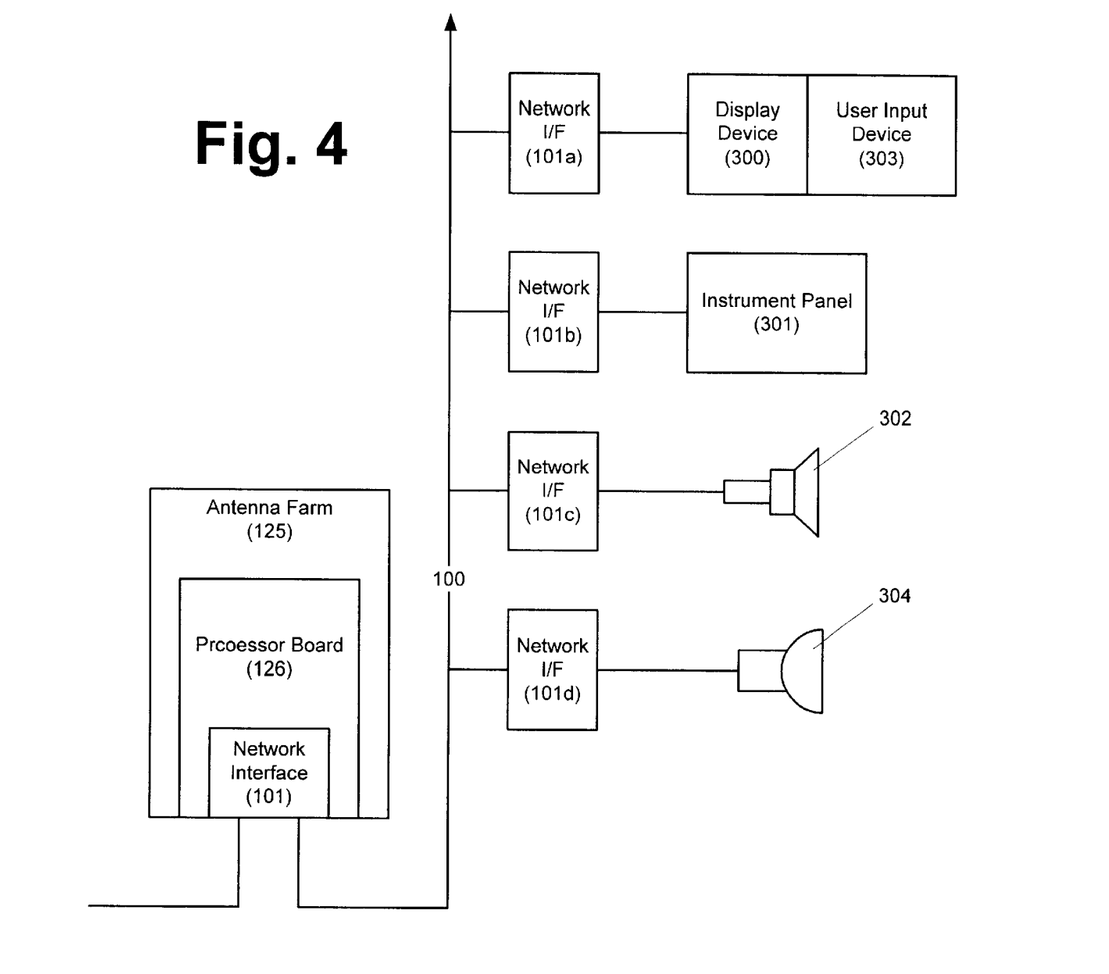
FIG. 4 is a block diagram illustrating the use of navigational data and wireless communications generated by the antenna farm of FIG. 2 by networked devices distributed throughout a vehicle.

FIG. 4 is a block diagram illustrating the distribution of navigational data generated by the GPS and inertial sensor systems to networked devices distributed throughout a vehicle. FIG. 4 also illustrates how wireless communications are provided via the antenna farm to and from various networked devices distributed throughout the vehicle.

As shown in FIG. 4 and as described above, the antenna farm (125) provides, among other things, navigational data from the GPS and inertial sensor systems. This navigational data is transmitted over the in-vehicle data network (100) for use by other networked devices. For example, this navigational data may be taken from the network by a network interface (101a) for display on a display device (300). This display device (300) may display basic navigational data or may combine the navigational data with an interactive map of the area in which the vehicle is located.

Additionally or alternatively, the navigational data may be taken from the network (100) through the same or another network interface (101b) for display by the vehicle's instrument panel (301). For example, some vehicle instrument panels (301) include a compass reading and other navigational data that can be displayed based on the navigational data provided over the network (100) from the antenna farm (125). Data can also be displayed in mirrors, visors, etc.

As described above, the antenna farm (125) can also provide two-way wireless communications with an area WWAN, WLAN or WPAN. For example, a data stream received from a WWAN, WLAN or WPAN can be received by the antenna farm (125) and distributed over the network (100).

The display device (300) may then obtain this data from the network (100) through an interface (101a) and display the data for a user. For example, this data stream may be a connection to the Internet and the user may view a web page or an e-mail with the display device (300). A user input device (303) is preferably associated with the display device (300). The user input device (303) may be a touch-screen on the display device (300), a keyboard or keypad, or any other device that allows a user to input commands or data.

With a user input device (303), the user can input data, such as a request for another web page at another URL or a reply to an e-mail message. This data is then transmitted to the network (100) through the interface (101a). The outgoing data is then received by the antenna farm (125) through the interface (101) and transmitted to the WWAN or WLAN with which the user is communicating.

As noted above, the system of the present invention may also be used for voice communication. For example, a speaker (302) may be connected to the network (100) through a network interface (101c). A digital audio signal can be taken from the network (100) by the interface (101c) and rendered audible by the speaker (302). This digital audio signal could be a voice transmission, e.g., a wireless telephone call, coming in through the WLAN or WWAN stages of the antenna farm (125). Alternatively, this audio signal could be audio or audiovisual programming produced by, for example, a CD audio player or a radio tuner connected to the network (100). Thus, the speaker (302) can serve many purposes within the network.

Additionally, a microphone (304) may be connected to the network (100) through a network interface (101d). This microphone (304) can transduce the speech of a user to generate a voice data stream that is transmitted over the network (100) to the antenna farm (125) for transmission via the WWAN or WLAN stages. Thus, with the speaker (302) and microphone (304), a user can conduct a wireless telephone call through the antenna farm (125) of the present invention. Preferably, this may be a hands-free system for conducting such a phone call.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of providing navigational data in a vehicle comprising:
    connecting a GPS receiver through a network interface to a digital data network installed in said vehicle such that said GPS receiver will output navigational data on said digital data network; and
    supplementing said navigational data from said GPS receiver with vehicle heading data from an inertial sensor also connected to said network interface, wherein said heading data from said inertial sensor is substituted for heading data from said GPS receiver if a speed of said vehicle is below a predetermined threshold.

2. The method of claim 1, wherein said digital data network is a fiber optic network and said network interface comprises a fiber optic transceiver, said method further comprising converting said navigational data into an optical signal for transmission on said fiber optic network.

3. The method of claim 1, further comprising receiving and displaying said navigational data with a display device connected to said digital data network.

4. A method of providing navigational data in a vehicle comprising:
    connecting a GPS receiver through a network interface to a digital data network installed in said vehicle such that said GPS receiver will output navigational data on said digital data network;
    supplementing said navigational data from said GPS receiver with vehicle heading data from an inertial sensor also connected to said network interface; and
    applying a correction factor to said vehicle heading data from said inertial sensor based on a declination zone in which said vehicle is located as determined from said navigational data output by said GPS receiver.

5. A method of providing navigational and communication systems for a vehicle comprising:
    connecting a GPS receiver through a network interface to a digital data network installed in said vehicle such that said GPS receiver will output navigational data on said digital data network;
    providing a wireless network stage for communicating with a wireless network that has a service area in which said vehicle is located; and
    providing a connection between said wireless network stage and said digital data network installed in said vehicle; and
    supplementing said navigational data from said GPS receiver with vehicle heading data from an inertial sensor also connected to said network interface, wherein said heading data from said inertial sensor is substituted for heading data from said GPS receiver if a speed of said vehicle is below a predetermined threshold.

6. A method of providing navigational and communication systems for a vehicle comprising:
    connecting a GPS receiver through a network interface to a digital data network installed in said vehicle such that said GPS receiver will output navigational data on said digital data network;
    providing a wireless network stage for communicating with a wireless network that has a service area in which said vehicle is located; and
    providing a connection between said wireless network stage and said digital data network installed in said vehicle;
    supplementing said navigational data from said GPS receiver with vehicle heading data from an inertial sensor also connected to said network interface; and
    applying a correction factor to said vehicle heading data from said inertial sensor based on a declination zone in which said vehicle is located as determined from said navigational data output by said GPS receiver.

7. A method of supplementing navigational data from a GPS receiver with vehicle heading data from an inertial sensor, said method comprising substituting said vehicle heading data from said inertial sensor for heading data from said GPS receiver if a speed of said vehicle is below a predetermined threshold.

8. A method of automatically calibrating an inertial sensor with output from a GPS receiver, said method comprising automatically applying a correction factor to vehicle heading data from said inertial sensor based on a declination zone in which said vehicle is located which is determined from said navigational data output by said GPS receiver.

9. A navigational system for a vehicle comprising:

a GPS receiver;

a digital data network installed in said vehicle;

a network interface connecting said GPS receiver and said digital data network, wherein said GPS receiver outputs navigational data on said digital data network;

an inertial sensor that provides vehicle heading data to supplement said navigational data from said GPS receiver, said inertial sensor also being connected to said network interface; and a micro-controller for processing said navigational data and said vehicle heading data before said data is output on said digital data network, wherein said micro-controller will substitute said heading data from said inertial sensor for heading data from said GPS receiver if a speed of said vehicle is below a predetermined threshold.

10. A navigational system for a vehicle comprising:

a GPS receiver;

a digital data network installed in said vehicle;

a network interface connecting said GPS receiver and said digital data network, wherein said GPS receiver outputs navigational data on said digital data network;

an inertial sensor that provides vehicle heading data to supplement said navigational data from said GPS receiver, said inertial sensor also being connected to said network interface; and a micro-controller for processing said navigational data and said vehicle heading data before said data is output on said digital data network, wherein said micro-controller will apply a correction factor to said vehicle heading data from said inertial sensor based on a declination zone in which said vehicle is located as determined from said navigational data output by said GPS receiver.

* * * * *

UNITED STATES PATENT AND TRADEMARK OFFICE
CERTIFICATE OF CORRECTION

PATENT NO. : 6,684,157 B1
DATED : January 27, 2004
INVENTOR(S) : Barman et al.

It is certified that error appears in the above-identified patent and that said Letters Patent is hereby corrected as shown below:

<u>Title page,</u>
Item [*] Notice, insert -- Subject to any disclaimer, the term of this patent is extended or adjusted under 35 U.S.C. 154(b) by 43 days. --

Signed and Sealed this

Nineteenth Day of July, 2005

JON W. DUDAS
*Director of the United States Patent and Trademark Office*